Dec. 8, 1964     E. J. ROTH     3,160,004
INSIDE DIAMETER GAUGE FOR RECESSED APERTURES
Filed Jan. 16, 1961
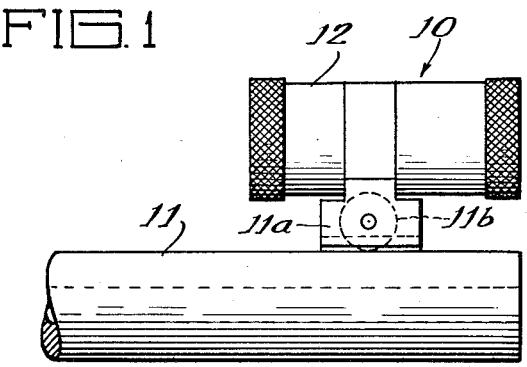
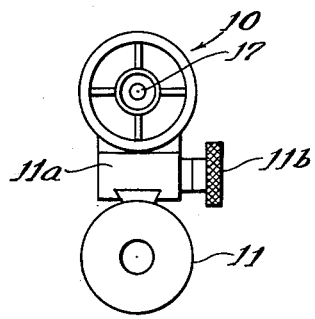
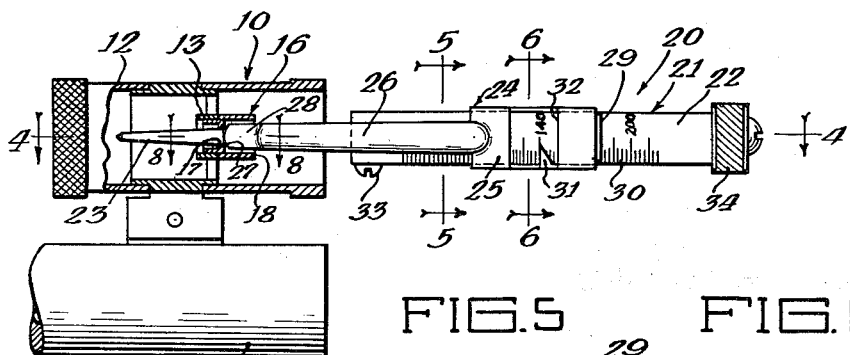
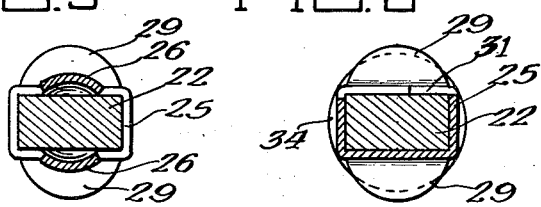
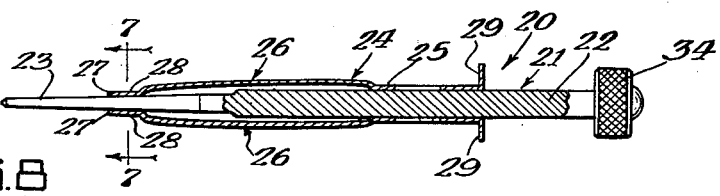
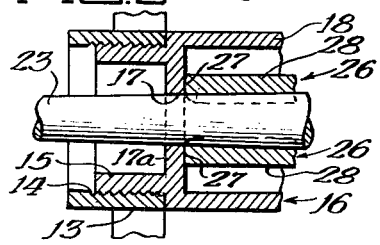
Inventor:
Edward J. Roth
By: Hofgren, Brady, Wegner,
Allen & Stillman
Attorneys

United States Patent Office 3,160,004
Patented Dec. 8, 1964

3,160,004
INSIDE DIAMETER GAUGE FOR RECESSED APERTURES
Edward J. Roth, 271 Fair Ave., Elmhurst, Ill.
Filed Jan. 16, 1961, Ser. No. 83,028
5 Claims. (Cl. 33—178)

This invention relates to a gauge for measuring the width of an aperture, and more particularly to a gauge for measuring the diameter of a recessed sighting aperture in a gun sight.

In addition to physical skill, proficiency in target shooting also requires an understanding of the equipment used, for example, an understanding of gun sights and targets. A popular type of front sight for use in target shooting has a recessed aperture which is aligned with the bull's-eye of the target. The aperture is recessed to eliminate glare and reflections from the vicinity of the aperture, and is preferably of such diameter that a small ring of white target background encircles the black bull's-eye. Different targets are used for shooting at different ranges, and the diameter of the bull's-eye does not vary in direct proportion to the intended distance of the target from the firing line. Therefore, to maintain the same white area around the bull's-eye for various target and firing distance combinations, the diameter of the sighting aperture in the front sight must be changed. For example, a front sight equipped with a sighting aperture which provides the desired white area around the bull's-eye when shooting at 100 yards on a 100 yard target, will not provide exactly the same white area around the bull's-eye of a 50 yard target, when sighted from 50 yards. A proficient target shooter, therefore, wants to know the diameter of the front sighting aperture. This is often difficult to determine when the aperture is recessed in the gun sight, and it may be necessary to disassemble the sight to read the size stamped thereon, or to accurately measure the sighting aperture.

Neither a step gauge, nor a jeweler's ring gauge having a scale engraved on a tapered shank, can be accurately read when inserted in a recessed aperture.

Therefore, a primary object of the invention is the provision of a gauge for measuring an aperture in a disk, the gauge including a base member with a body and extending outwardly from the body a tapered rod to be seated in the aperture, and a head member mounted on the base member and having positioning means movable longitudinally of the tapered rod for abutting the disk, and cooperating means on the body and the head member for indicating the width of the aperture.

Another object of the invention is the provision of a gauge for measuring a sighting aperture in a recessed sighting disk of a gun sight, the gauge comprising a base member having a body with a tapered rod extending outwardly from the body and adapted to be seated in the sighting aperture, and a head member having a sleeve telescopically received on the body with a pair of opposed resilient fingers fixed to and extending outwardly from the sleeve on opposite sides of the tapered rod with portions of the resilient fingers frictionally engaging the tapered rod to retard movement of the head member relative to the base member, and with positioning means comprising free ends of the fingers adjacent the tapered rod and adapted to abut the disk adjacent the sighting aperture, with the diameter of the sighting aperture being read from cooperating means including an index in an opening in the sleeve and a scale on the body.

A preferred embodiment of the invention is illustrated in the accompanying drawings in which:

FIGURE 1 is a side elevational view of the muzzle end of a rifle barrel on which is mounted a conventional front sight;

FIGURE 2 is a front or muzzle view of the rifle barrel and front sight illustrated in FIGURE 1;

FIGURE 3 is a side elevational view of a gauge positioned in the sighting aperture of the gun sight, with parts broken away to more clearly show the construction;

FIGURE 4 is a sectional view taken on the line 4—4 in FIGURE 3;

FIGURE 5 is a sectional view on an enlarged scale taken on the line 5—5 in FIGURE 3;

FIGURE 6 is a sectional view on an enlarged scale taken on the line 6—6 in FIGURE 3;

FIGURE 7 is a sectional view on an enlarged scale taken on the line 7—7 in FIGURE 4; and FIGURE 8 is a sectional view on an enlarged scale taken on the line 8—8 in FIGURE 3.

Referring to FIGURES 1 and 2 of the drawings, a front gun sight 10 is securely mounted in any suitable manner on the muzzle end of a rifle barrel 11, as by means of a dovetail mounting 11a and locking screw 11b. As may best be seen in FIGURES 3 and 8, the gun sight 10 includes an outer hood 12 mounted on the rifle barrell 11, and fixed to the inside of the hood 12 is a mounting 13 having a threaded socket 14 receiving a threaded boss 15 of an interchangeable sighting aperture insert 16. The sighting aperture insert 16 has a sighting aperture 17 in a disk 17a which is recessed within an insert sleeve 18, and the entire sighting aperture insert 16 is recessed within the outer hood 12, to eliminate reflections and glare from the vicinity of the sighting aperture.

A gauge 20 provides means for measuring the diameter of the recessed sighting aperture 17. The gauge 20 has a base member 21 including an integrally formed body 22 and a tapered rod 23 extending outwardly from an end of the body 22. The tapered rod is adapted to be firmly seated in the sighting aperture 17. Slidably mounted on the body 22 is a head member 24 having a head in the form of a sleeve 25 telescopically received on the body 22, and a pair of opposed resilient fingers 26 integral with the sleeve and substantially parallel to the longitudinal axis of the tapered rod 24. The resilient fingers 26 have free ends 27 on opposite sides of the tapered rod 23, providing poistioning means for abutting the disk 17a adjacent the sighting aperture 17 when the tapered rod 23 is firmly seated in the sighting aperture. The free ends 27 are convex to allow for slight canting of the tapered rod 23 in the sighting aperture 17 without upsetting the accuracy of a gauging operation. Clamping portions 28 on the resilient fingers 26 adjacent the free ends 27 are sufficiently narrow to enter the insert sleeve 18, frictionally engage the tapered rod 23 to retard movement of the head member 24 longitudinally of the base member 21. The end of the sleeve 25 opposite the resilient fingers 26 has transversely extending ears 29 providing grips for moving the head member 24 on the base member 21.

When the tapered rod 23 is seated in the aperture 17, and the free ends 27 of the resilient fingers 26 abut the disk 17a alongside the aperture 17, the diameter of the sighting aperture 17 may be read directly from cooperating means including a scale 30 on the body 22, at a point adjacent an index in the form of a pointer 31 extending into an opening 32 in the sleeve 25.

The head member 24 is retained on the base member 21 by a screw 33 in the front end of the body 22 and a knurled knob 34 on the rear end of the body 22.

The foregoing detailed description is given for clearness of understanding only and no unnecessary limitations are to be understood therefrom, as some modifications will be obvious to those skilled in the art.

I claim:

1. A gauge for measuring an aperture in a recessed surface, comprising: a unitary base having an elongated body which is of uniform cross section and an outwardly tapered gauging rod at an end of the body; unitary slide means including a sleeve slidably embracing the body, a pair of opposed relatively thin resilient fingers extending from the sleeve along the body and the rod in relatively close spaced relationship thereto, said fingers having inturned free end portions slidably gripping the tapered rod, whereby the rod may be firmly seated in an aperture in a recessed surface and the sleeve slid along the body to abut the tips of the fingers against the recessed surface; and cooperating means on the body and on the sleeve for indicating the position of the finger tips on the rod, said means being calibrated to show the diameter of the rod at the tips of the fingers.

2. The device of claim 1 in which the tips of the fingers are arcuate so that the scale means may give the same reading despite slight canting of the rod in an aperture.

3. The device of claim 1 in which the elongated body is rectangular and the sleeve is rectangular.

4. The device of claim 1 in which the sleeve has laterally projecting, integral ears providing grips that are spaced from the fingers.

5. The device of claim 1 in which the cooperating means include a scale comprising transverse parallel lines on the body, and an integral index pointer on the sleeve, said pointer extending into an opening in the sleeve and overlying the portion of the body which bears said transverse parallel lines.

References Cited in the file of this patent
UNITED STATES PATENTS

| | | |
|---|---|---|
| 490,860 | Snoeck | Jan. 31, 1893 |
| 953,282 | Nash | Mar. 29, 1910 |
| 2,888,751 | Pedrick | June 2, 1959 |